United States Patent
Everhart et al.

(10) Patent No.: US 11,025,728 B2
(45) Date of Patent: Jun. 1, 2021

(54) METHODS FOR FACILITATING SECURE CONNECTIONS FOR AN OPERATING SYSTEM KERNEL AND DEVICES THEREOF

(71) Applicant: NetApp, Inc., Sunnyvale, CA (US)

(72) Inventors: Craig Everhart, Pittsburgh, PA (US); Flora Wong, Palo Alto, CA (US); Ankit Jain, San Jose, CA (US); Vijay Singh, San Jose, CA (US); Robert Wyckoff Hyer, Jr., Seven Fields, PA (US); Balajee Nagasubramaniam, Dublin, CA (US)

(73) Assignee: NETAPP, INC., Sunnyvale, CA (US)

( * ) Notice: Subject to any disclaimer, the term of this patent is extended or adjusted under 35 U.S.C. 154(b) by 490 days.

(21) Appl. No.: 15/152,219

(22) Filed: May 11, 2016

(65) Prior Publication Data

US 2017/0331903 A1 Nov. 16, 2017

(51) Int. Cl.
*H04L 29/08* (2006.01)
*H04L 29/06* (2006.01)

(52) U.S. Cl.
CPC ........ *H04L 67/141* (2013.01); *H04L 63/0281* (2013.01); *H04L 63/0428* (2013.01); *H04L 63/166* (2013.01); *H04L 67/1097* (2013.01); *H04L 67/28* (2013.01)

(58) Field of Classification Search
CPC ........... H04L 12/4608; H04L 29/06551; H04L 12/4641; H04L 12/4662; H04L 63/0428; H04L 69/16; H04L 67/141; H04W 12/00; H04W 36/0038

USPC ......................................................... 709/227
See application file for complete search history.

(56) References Cited

U.S. PATENT DOCUMENTS

| | | | | |
|---|---|---|---|---|
| 7,631,182 | B1 * | 12/2009 | Droux | H04L 63/166 713/151 |
| 2013/0246627 | A1 * | 9/2013 | Taylor | H04L 63/0263 709/227 |
| 2014/0304498 | A1 * | 10/2014 | Gonuguntla | H04L 63/168 713/151 |
| 2018/0041477 | A1 * | 2/2018 | Shaposhnik | G06F 9/45545 |

* cited by examiner

*Primary Examiner* — Tan Doan
(74) *Attorney, Agent, or Firm* — Troutman Pepper Hamilton Sanders LLP (Rochester)

(57) ABSTRACT

A method, non-transitory computer readable medium and local storage node computing device that establishes a first connection between a first endpoint in a kernel of an operating system and a second endpoint. A proxy application in a user space is invoked and a second connection is established from the operating system kernel to the proxy application. The proxy application is linked to a secure protocol implementation. Handshake messages are proxied between the second endpoint and the proxy application using the first and second connections. Security parameters for the first connection and determined from the handshake messages are sent from the proxy application to the operating system kernel via the second connection. Data is exchanged between the first endpoint in the operating system kernel and the second endpoint using the first connection and the security parameters.

20 Claims, 5 Drawing Sheets

METHODS FOR FACILITATING SECURE CONNECTIONS FOR AN OPERATING SYSTEM KERNEL AND DEVICES THEREOF

FIELD

This technology relates to data security in communication networks, and more particularly to methods and devices for facilitating secure connections for an operating system kernel.

BACKGROUND

As larger amounts of data are generated and communicated across networks, data security is increasingly important. Cryptographic security protocols including secure sockets layer (SSL) and transport layer security (TLS) have been developed that facilitate secure communications over computer networks. In many computing environments, data is exchanged via applications having associated connections that are established with at least one endpoint in an operating system kernel.

In one particular example, storage node computing devices, such as storage servers or controllers, have operating systems that utilize endpoints in kernel space. The endpoints in kernel space can be utilized by storage node computing devices to communicate with other storage node computing devices across network(s) in order to perform storage management functions, such as backup, disaster avoidance, or load sharing, for example. Many other types of computing devices also utilize endpoints in operating system kernels.

Currently, kernel applications often utilize transport control protocol (TCP) connections over public communication networks (e.g., the Internet) to send data in plain text or without any encryption or security. The data sent via unsecure TCP connections is susceptible to being observed, obtained, or manipulated, for example, which is undesirable.

In order to facilitate secure connections for operating system kernels, SSL/TLS can be ported into kernel space. However, porting implementations of SSL/TLS into kernel space is problematic because the associated code is complex. Performing cryptographic negotiation, for example, strains the resources available to operating system kernels. Additionally, SSL/TLS implementations are often updated, and recurring maintenance of ported software at the kernel level is relatively difficult. In particular, many updates are relatively important and repair security vulnerabilities that could allow attacks.

Alternatively, applications in kernel space can utilize an SSL/TLS implementation hosted in user space. However, an additional manipulation of data is required to interface with an SSL/TLS implementation hosted in user space, which results in relatively slow performance. The increased latency resulting from leveraging an SSL/TLS implementation hosted in user space is particularly problematic in environments in which the speed of communications and data across a network is critical.

DETAILED DESCRIPTION

Figure 1:
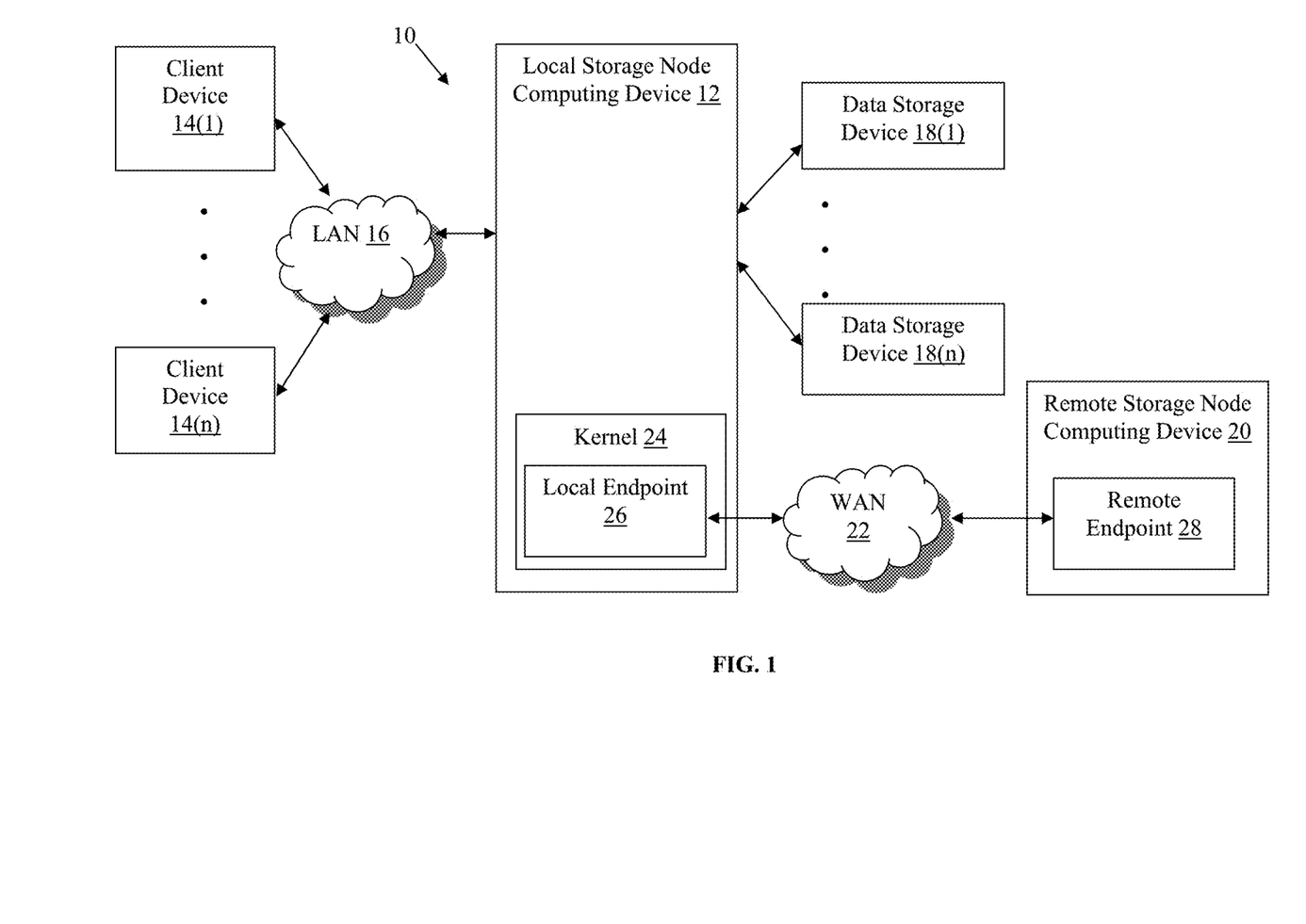
FIG. 1 is a block diagram of a network environment with an exemplary local storage node computing device with a local endpoint in an operating system kernel.

A network environment 10 including an exemplary local storage node computing device 12 is illustrated in FIG. 1. The local storage node computing device 12 in this example is coupled to client devices 14(1)-14(n) via a local area network (LAN) 16, data storage devices 18(1)-18(n) via a bridge or switch (not shown), and a remote storage node computing device 20 via a wide area network (WAN) 22 although this network environment 10 can include other numbers and types of systems, devices, components, and/or elements in other configurations. Additionally, the network environment 10 may include other network devices such as one or more routers and/or switches, for example, which are well known in the art and thus will not be described herein.

The local storage node computing device 12 includes an operating system kernel 24 that includes a local endpoint 26 that can be coupled to a remote endpoint 28 of the remote storage node computing device 20 by a connection over the WAN 22, although the remote endpoint 24 can be located at any type of computing devices. This technology provides a number of advantages including methods, non-transitory computer readable media, and devices that facilitate more efficient secure connections from endpoints in operating system kernels to remote endpoints based, in part, by advantageously utilizing a proxy application in user space to handle a handshake or negotiation phase of a secure protocol and the kernel to handle a subsequent data phase in which data is exchanged with a remote endpoint.

Figure 2:
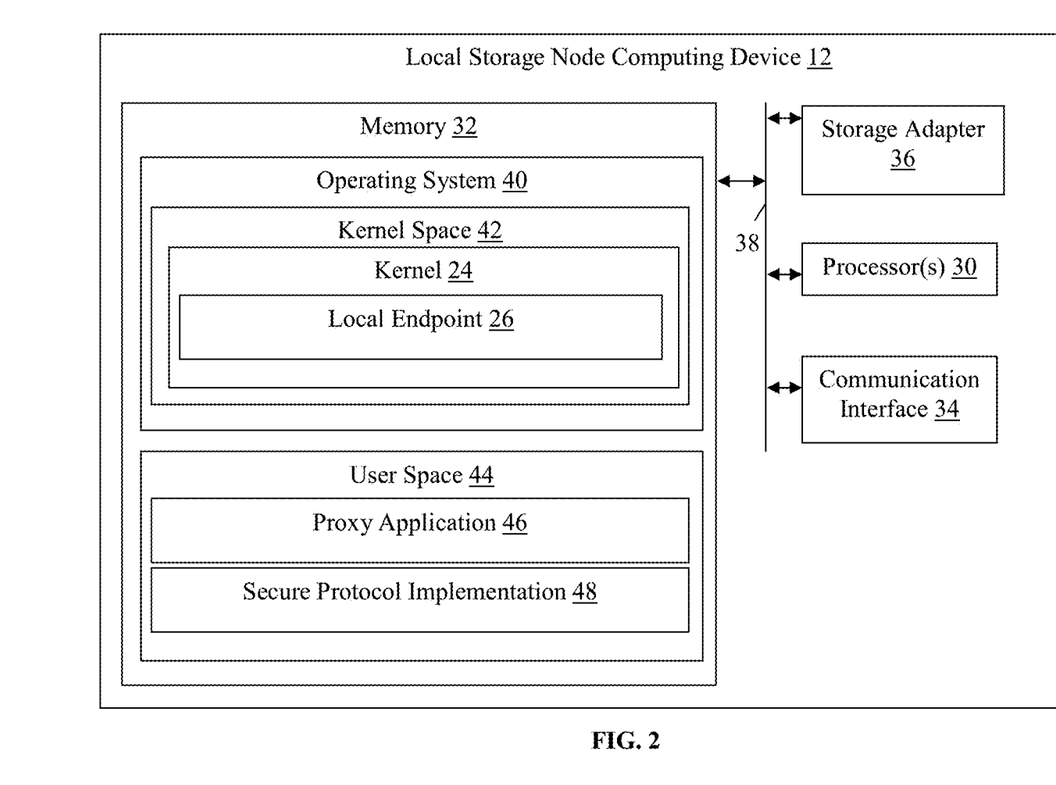
FIG. 2 is a block diagram of the exemplary local storage node computing device shown in FIG. 1.

Referring to FIG. 2, a block diagram of the exemplary local storage node computing device 12 is illustrated. The local storage node computing device 12 generally provides file services relating to the organization of information on the data storage devices 18(1)-18(n) on behalf of the client devices 14(1)-14(n). In this example, the local storage node computing device 12 includes processor(s) 30, a memory 32, a communication interface 34, and a storage adapter 36, which are coupled together by a bus 38 or other communication link.

The processor(s) 30 of the local storage node computing device 12 may execute a program of stored instructions for one or more aspects of the this technology, as described and illustrated by way of the embodiments herein, although the processor(s) 30 could execute other numbers and types of programmed instructions. The processor(s) 30 in the local storage node computing device 12 may include one or more central processing units (CPUs) or general purpose processors with one or more processing cores, for example.

The memory 32 of the local storage node computing device 12 may include any of various forms of read only memory (ROM), random access memory (RAM), flash memory, non-volatile or volatile memory, or the like, or a combination of such devices, for example. In this example, the memory includes an operating system 40, the kernel 26 configured to execute in a kernel space 42, and the local endpoint 26 disposed at the kernel 24. Additionally, the memory 32 in this particular example includes a user space 44 and a proxy application 46 configured to execute in the user space 44 and linked to a secure protocol implementation 48, although other types and/or numbers of applications or modules can also be included in other examples.

The operating system 34 is configured to functionally organize stored data by invoking storage operations to facilitate file services provided by the local storage node computing device 12, among other functions. In particular, the operating system 34 implements a file system to logically organize information as a hierarchical structure of directories and files on the data storage devices 18(1)-18(n). Accordingly, the operating system 34 cooperates with the storage adapter 36 to access information requested by the client devices 14(1)-14(n) and stored on the data storage devices 18(1)-18(n), among other functions.

The operating system includes the kernel 24, which manages startup for the local storage node computing device, translates messages received from higher level software executing on the local storage node computing device 12, and manages the memory 32 of the local storage node computing device 12, for example, among other functions. The kernel 24 executed in a kernel space 42 segregated by the operating system 40 and can run processes that perform the above-identified functions, as well as other storage functions such as backup, disaster avoidance, and load sharing, for example. In order to carry out such functionality, the kernel 24 can establish the local endpoint 26, which can have an associated address or other identifier that is used in a connection with the remote endpoint 28.

The operating system 40 can further segregate the memory 32 into user space 44 that hosts higher level applications, including the proxy application 46. The proxy application 46 can be a daemon or other type of application that is configured to handle the negotiation phase of a secure protocol in order to facilitate a secure connection between the local endpoint 26 and the remote endpoint 28. In particular, the proxy application can receive SSL/TLS handshake messages from the kernel 24 that were sent from the remote endpoint 28 and can interface with the secure protocol implementation 48 to process the messages in order to carry out a cryptographic negotiation, for example, on behalf of the kernel 24, as described and illustrated in more detail later.

The secure protocol implementation 48 can be a package, library, or toolkit that includes an SSL/TLS implementation that can be leveraged by the proxy application 46 when processing messages proxied from the kernel 24. As the secure protocol implementation 48 is relatively complex, it is advantageously executed with the proxy application 46 in user space with this technology. In one example, the secure protocol implementation 48 can be an OpenSSL library, although other types of secure protocol implementations can be used in other examples. By hosting the secure protocol implementation 48 in the user space 44, maintaining the code associated with the secure protocol implementation 48 is relatively easy as compared to porting such code to the kernel space 42.

The communication interface 34 of the local storage node computing device 12 can include one or more network interface controllers (NICs) for operatively coupling and communicating between the local storage node computing device 12 and the client devices 14(1)-14(n) via the LAN 16 and, optionally, between the local storage node computing device 12 and the remote storage node computing device 30 via the WAN 22, although other types and numbers of communication networks or systems with other types and numbers of connections and configurations to other devices and elements also can be used.

By way of example only, the LAN and/or WAN 22 can use TCP/IP over Ethernet and industry-standard protocols, including NFS, CIFS, SOAP, XML, LDAP, and SNMP, although other types and numbers of communication networks can be used. The LAN and/or WAN 22 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The communication network(s) 16 may also comprise any local area network and/or wide area network (e.g., Internet), although any other type of traffic network topologies may be used.

The storage adapter 36 can cooperate with the operating system 40 to access information requested by the client devices 14(1)-14(n). The information may be stored on the data storage devices 18(1)-18(n) in logical volumes, for example. The storage adapter 36 includes input/output (I/O) or communication interface circuitry that couples to the data storage devices 18(1)-18(n) over an I/O interconnect arrangement such as a conventional high-performance, Fibre Channel serial link topology, SAS, SCSI, or SATA, for example. The storage adapter 36 can communicate with the data storage devices 18(1)-18(n) over a network, switch, and/or bridge (not shown). The data storage devices 18(1)-18(n) can be housed in a shelf or other enclosure, for example, and the data storage devices 18(1)-18(n) can also be located elsewhere in the network environment 10.

Referring back to FIG. 1, each of the client devices 14(1)-14(n) in this example includes a processor, a memory, a communication interface, and optionally an input device, and a display device, which are coupled together by a bus or other link, although each of the client devices 14(1)-14(n) can have other types and numbers of components or other elements and other numbers and types of network devices could be used.

The client devices 14(1)-14(n) may run interface applications that provide an interface to make requests for and send content and/or data to the local storage node computing device 12 via the LAN 16, for example. Each of the client devices 14(1)-14(n) may be an application server hosting applications that utilize backend storage, or any other type of processing and/or computing device, for example.

The data storage devices 18(1)-18(n) can be hard disk drives, solid state drives, flash drives (e.g., in an all flash array), optical disk-based storage, any combination thereof, or any other type of stable, non-volatile storage suitable for storing files or objects in storage volumes for short or long term retention, for example. The data storage devices 18(1)-18(n) optionally host one or more volumes based on a Redundant Array of Inexpensive Disks (RAID) architecture or other topology facilitating data persistency, although other types and numbers of volumes in other topologies can also be used.

The remote storage node computing device 20 can be the same type of storage node computing device as the local storage node computing device 12, with one or more of the same components illustrated in FIG. 2. Alternatively, the remote storage node computing device 20 can be any other type of computing device configured to execute one or more applications or processes that utilize connections (e.g., TCP connections) and are configured to establish the remote endpoint 28 in order to facilitate the connections and communicate data to the local storage node computing device 12.

Although examples of the local storage node computing devices 12, client devices 14(1)-14(n), data storage devices 18(1)-18(n), and remote storage node computing device 20 are described and illustrated herein, it is to be understood that the devices and systems of the examples described herein are for exemplary purposes, as many variations of the specific hardware and software used to implement the examples are possible, as will be appreciated by those skilled in the relevant art(s). In addition, two or more computing systems or devices can be substituted for any one of the systems in any embodiment of the examples.

The examples also may be embodied as one or more non-transitory computer readable media having instructions stored thereon for one or more aspects of the present technology, as described and illustrated by way of the examples herein, which when executed by the processor, cause the processor to carry out the steps necessary to implement the methods of this technology, as described and illustrated with the examples herein.

Figure 3:
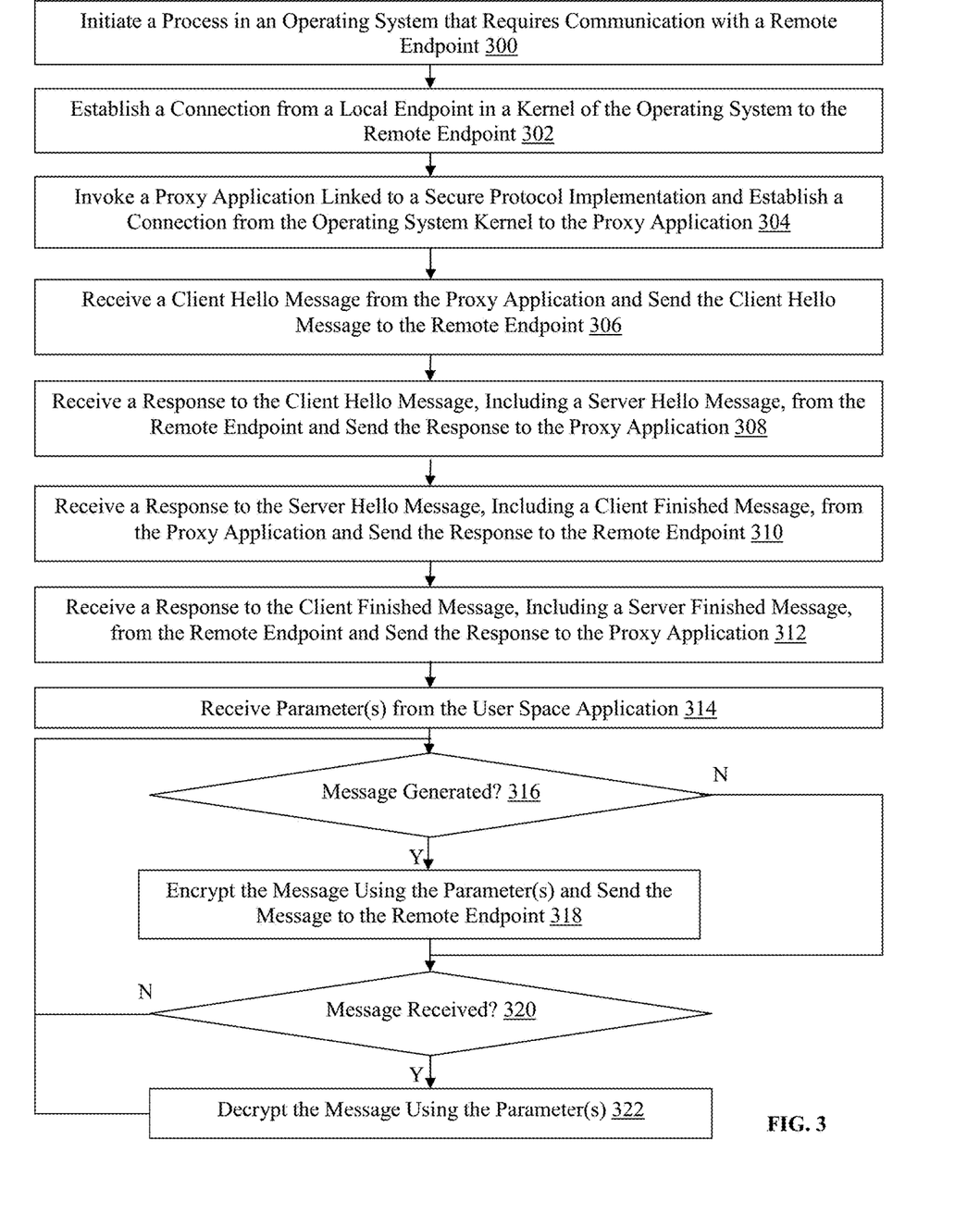
FIG. 3 is a flowchart of an exemplary method for interfacing, by an operating system kernel, with a proxy application in a user space in order to facilitate secure connections for the operating system kernel.

An exemplary method for facilitating secure connections for an operating system kernel will now be described with reference to FIGS. 1-5. Referring more specifically to FIG. 3, a flowchart of an exemplary method for interfacing, by the operating system kernel 24, with the proxy application 46 in the user space 44 in order to facilitate secure connections for the kernel 24 is illustrated. In step 300, the kernel 24 executing on the local storage node computing device 12 initiates a process that requires communication with a remote endpoint 28.

The remote endpoint 28 is hosted at the remote storage node computing device 20 in this particular example, but can be associated with any other type of device in other examples. The process in the kernel 24 can be related to storage functionality provided by the local storage node computing device 12, such as backup, disaster avoidance, load sharing, or any other type of storage functionality, although other functionality can also be provided by the process. The process in this example requires secure communication of data over the WAN 22 (e.g., the Internet) from the local endpoint 26 to the remote endpoint 28.

In step 302, the kernel 24 executing on the local storage node computing device 12 establishes a connection from the local endpoint 26 in the kernel 24 to the remote endpoint 28 over the WAN 22. The connection can be a transmission control protocol (TCP) connection, for example, although other types of connections can also be used.

In step 304, the kernel 24 executing on the local storage node computing device 12 invokes the proxy application 46 in the user space 44. The kernel 24 in this example invokes the proxy application 46 by establishing a connection with the proxy application 46, which is linked to the secure protocol implementation 48 (e.g., an implementation of secure sockets layer (SSL)/transport layer security (TLS), such as OpenSSL). The operation of the proxy application 46 is described and illustrated in more detail later with reference to FIG. 4.

In step 306, the kernel 24 executing on the local storage node computing device 12 receives a client hello message generated by the proxy application 46 using the secure protocol implementation 48. Accordingly, the proxy application 46 is configured to interface with the secure protocol implementation to initiate a handshake process according to the secure protocol, when invoked. In particular, the proxy application 46 generates a client hello messages according to an SSL/TLS secure protocol in this example.

Subsequent to receiving the client hello message via the connection with the proxy application 46 established in step 304, the kernel 24 sends the client hello message to the remote endpoint 28 over the WAN 22 using the TCP connection established in step 302. The proxy application 46 in this particular example is configured to handle the client portion of the SSL/TLS handshake negotiation, but the proxy application 46 could also handle the server portion of the SSL/TLS handshake negotiation in other examples, and other secure protocols can also be used.

Referring back to FIG. 3, in step 308 the kernel 24 executing on the local storage node computing device 12 receives, at the local endpoint 26, a response to the client hello messages from the remote endpoint 28 using the TCP connection established in step 302. The response to the client hello messages can include a server hello message including a server certificate, server key, a client certificate request, and/or a server hello done message, although other types of messages and parameters can also be received from the remote endpoint 28.

As the kernel 24 it not linked to any secure protocol implementation in the kernel space 42, the kernel 24 cannot effectively interpret the parameters (e.g., certificate, key, encryption methods) received (or sent) during the secure protocol handshake negotiation. Accordingly, in step 308, the kernel 24 sends the response to the proxy application 46 via the connection established in step 304 for processing, as described and illustrated in more detail later with reference to FIG. 4.

In step 310, the kernel 24 executing on the local storage node computing device 12 receives a response to the server hello message from the proxy application 46 via the connection established in step 304. The response to the server hello message can include a client certificate, client key, certificate verification, cipher suite information, and/or client finished message, although other types of messages and parameters can also be received from the proxy application 46 in other examples. In step 310, the kernel 24 also sends the response to the server hello message to the remote endpoint 28 using the connection established in step 302.

In step 312 in this particular example, the kernel 24 executing on the local storage node computing device 12 receives, at the local endpoint 26, a response to the client finished message from the remote endpoint 28 and via the connection established in step 302. The response to the client finished message can include a server finished message and, optionally, one or more parameters including additional cipher information, for example.

In one example, the response to the client hello messages can be sent in step 308, and/or the response to the client finished message can be sent in step 312, to the proxy application 46 in response to a received request from the proxy application 46 as the proxy application is aware of the steps of the handshake process based on the secure protocol implementation 48. In this example, the proxy application 46 can use headers and request certain byte sizes of data received by the kernel 24 at the local endpoint 26. In another example, the kernel 24 can also send the responses in step 308 and/or 312 to the proxy application 46 without being prompted by the proxy application 46, and other methods of communicating between the kernel 24 and the proxy application 46 using the connection established in step 304 can also be used.

In step 314, the kernel 24 executing on the local storage node computing device 12 receives one or more security parameters that correspond to an encryption method to be used to encrypt and decrypt data exchanged with the remote endpoint 28. The security parameter(s) are received from the proxy application 46 via the connection established in step 304. Accordingly, the proxy application 46 effectively carries out the secure protocol handshake, negotiates an encryption method on behalf of the kernel 24, and communicates the results of that handshake and negotiation, including security parameters that can be used to implement an encryption method, to the kernel 24.

In step 316, the kernel 24 executing on the local storage node computing device 12 determines whether a message has been generated by the process that was initiated in step 300. The message can be a request to send data to the remote endpoint 28 in examples in which the process is associated with a backup application, for example, although any other types of messages and processes can also be used. If the kernel 24 determines that a message was generated by the process, then the Yes branch is taken to step 318.

In step 318, the kernel 24 executing on the local storage node computing device 12 encrypts data corresponding to the message using the security parameter(s) received in step 314 that correspond with the encryption method negotiated during the handshake phase in steps 306-312. In step 314, the kernel 24 also sends the encrypted message to the remote endpoint 28 via the TCP connection established in step 302 and over the WAN 22. Subsequent to sending the encrypted message, or if the kernel 24 determines in step 316 that a message has not been generated by the process and the No branch is taken, then the local storage node computing device 12 proceeds to step 320.

In step 320, the kernel 24 executing on the local storage node computing device 12 determines whether a message has been received at the local endpoint 26 from the remote endpoint 28 via the TCP connection established in step 302 and over the WAN 22. If the kernel 24 determines that a message has been received, then the Yes branch is taken to step 322.

In step 322, the kernel 24 executing on the local storage node computing device 12 decrypts the received message using the security parameter(s) received in step 314 that correspond with the encryption method negotiated during the handshake phase in steps 306-312. While one exemplary handshake exchange is described and illustrated herein with reference to FIG. 3, other types of handshake exchanges with other types and number of messages and parameters can also be used in other examples. Subsequent to decrypting the received message, or if the kernel 24 determines in step 320 that a message has not been received from the remote endpoint 28 and the No branch is taken, then the local storage node computing device 12 proceeds back to step 316.

Accordingly, the local storage node computing device 12 effectively waits for a message to be generated by the process initiated in step 300, to be sent via the local endpoint 26, or received from the remote endpoint 18, to be retrieved by the process initiated in step 300, in this particular example. Steps 316-322 collectively comprise a data phase of secure communication across the WAN 22 via the TCP connection established in step 302. Since the kernel 24 received the security parameter(s) from the proxy application 46 that are required to secure or encrypt the data exchanged via the TCP connection established in step 302, the data phase in this example is advantageously carried out by the kernel 24 entirely in the kernel space 42 without any interaction or communication with the proxy application 46 or any other process or application in the user space 44.

Figure 4:
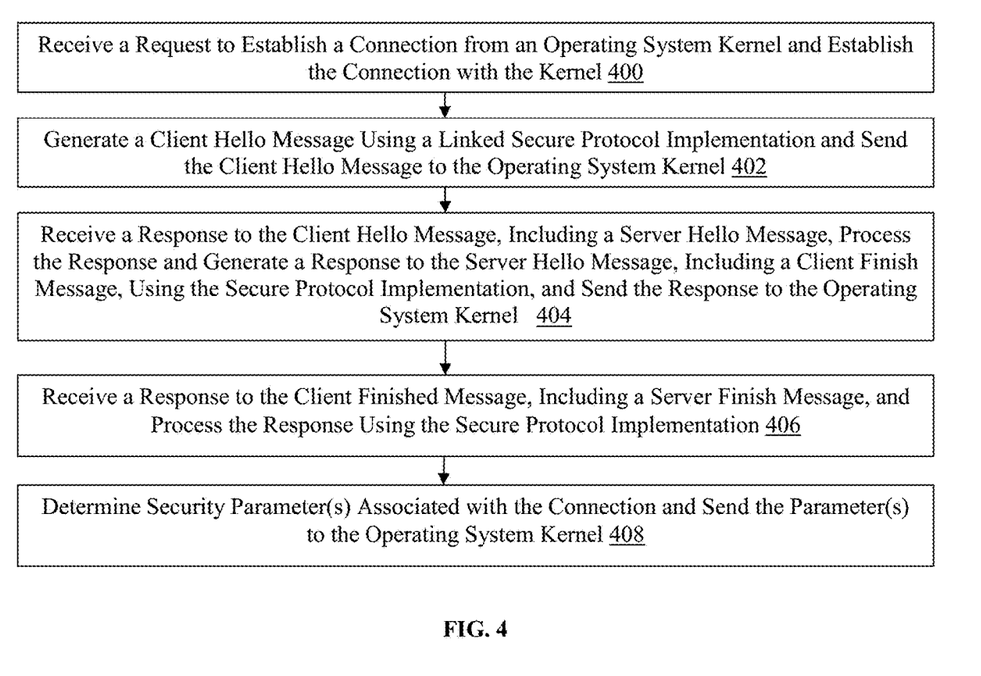
FIG. 4 is a flowchart of an exemplary method for interfacing, by a proxy application in a user space, with an operating system kernel in order to facilitate secure connections for the operating system kernel.

Referring more specifically to FIG. 4, a flowchart of an exemplary method for interfacing, by the proxy application 46 in the user space 44, with a kernel 24 of the operating system 40 in order to facilitate secure connections for the kernel 24 is illustrated. In step 400 in this example, the proxy application 46 in the user space 44 of the local storage node computing device 12 receives a request to establish a connection from the kernel 24 and establishes the connection with the kernel 24 in response to the request. The request can be sent as part of the invocation of the proxy application 46 by the kernel 24, as described and illustrated in more detail earlier with reference to step 304.

In step 402, the proxy application 46 executing on the local storage node computing device 12 generates a client hello message using the linked secure protocol implementation 48, although other types of messages can be generated in order to initiate a handshake phase of a secure protocol negotiation. Additionally, the handshake exchange described and illustrated with reference to FIG. 4 is exemplary, and other types of handshake exchanges with other types and number of messages and parameters can also be used in other examples. Accordingly, when invoked, the proxy application 46 is configured to initiate an SSL/TLS handshake in this particular example by generating a client hello message and sending the client hello message to the kernel 24 via the connection established in step 400. The kernel 24 can then send the client hello message to the remote endpoint 28, as described and illustrated in more detail earlier with reference to step 306 of FIG. 3.

Referring back to FIG. 4, in step 404, the proxy application 46 executing on the local storage node computing device 12 receives a response to the client hello message from the kernel 24 via the connection established in step 400. In this example, the response to the client hello message includes a server hello message including a server certificate, server key, client certificate request, and/or server hello done message, although other types of parameters and/or messages can also be received in step 404. The response to the client hello message can be actively requested by the proxy application 46 or passively received by the proxy application 46 from the kernel 24, for example.

The proxy application 46 in this example is configured to process the response to the client hello message using the secure protocol implementation 48, such as by extracting and analyzing the parameter(s) in the response to the client hello message in order to generate a response to the server hello message. The response to the server hello message can include a client certificate, client key, certificate verification, cipher information, and/or client finished message, although other types of parameters and/or messages can also be used in other examples. In step 404, the proxy application 46 also sends the generated response to the server hello message to the kernel 24 via the connection established in step 400. The kernel 24 can then send the generated response to the server hello message to the remote endpoint 28, as described and illustrated in more detail earlier with reference to step 310 of FIG. 3.

Referring back to FIG. 4, in step 406, the proxy application 46 executing on the local storage node computing device 12 receives a response to the client finished message from the kernel 24 via the connection established in step 400. In this example, the response to the client finished message includes a server finished message and, optionally, additional cipher information, although other types of parameters and/or messages can also be received in step 406. The response to the client finished message can be actively requested by the proxy application 46 or passively received by the proxy application 46 from the kernel 24, for example. The proxy application 46 is configured to process the response to the client finished message using the secure protocol implementation 48, such as by extracting and analyzing the parameter(s) (e.g., the additional cipher information) in the response to the client finished message.

In step 408, the proxy application 46 executing on the local storage node computing device 12 determines one or more security parameter(s) corresponding to an encryption method to be used by the kernel 24 for communications across a TCP connection with the remote endpoint 28 in a data phase, as described and illustrated in more detail earlier with reference to steps 316-322 of FIG. 3. The security parameter(s) can be determined using the secure protocol implementation 48, and can be extracted or derived from one or more of the messages exchanged during the handshake phase, for example.

Figure 5:
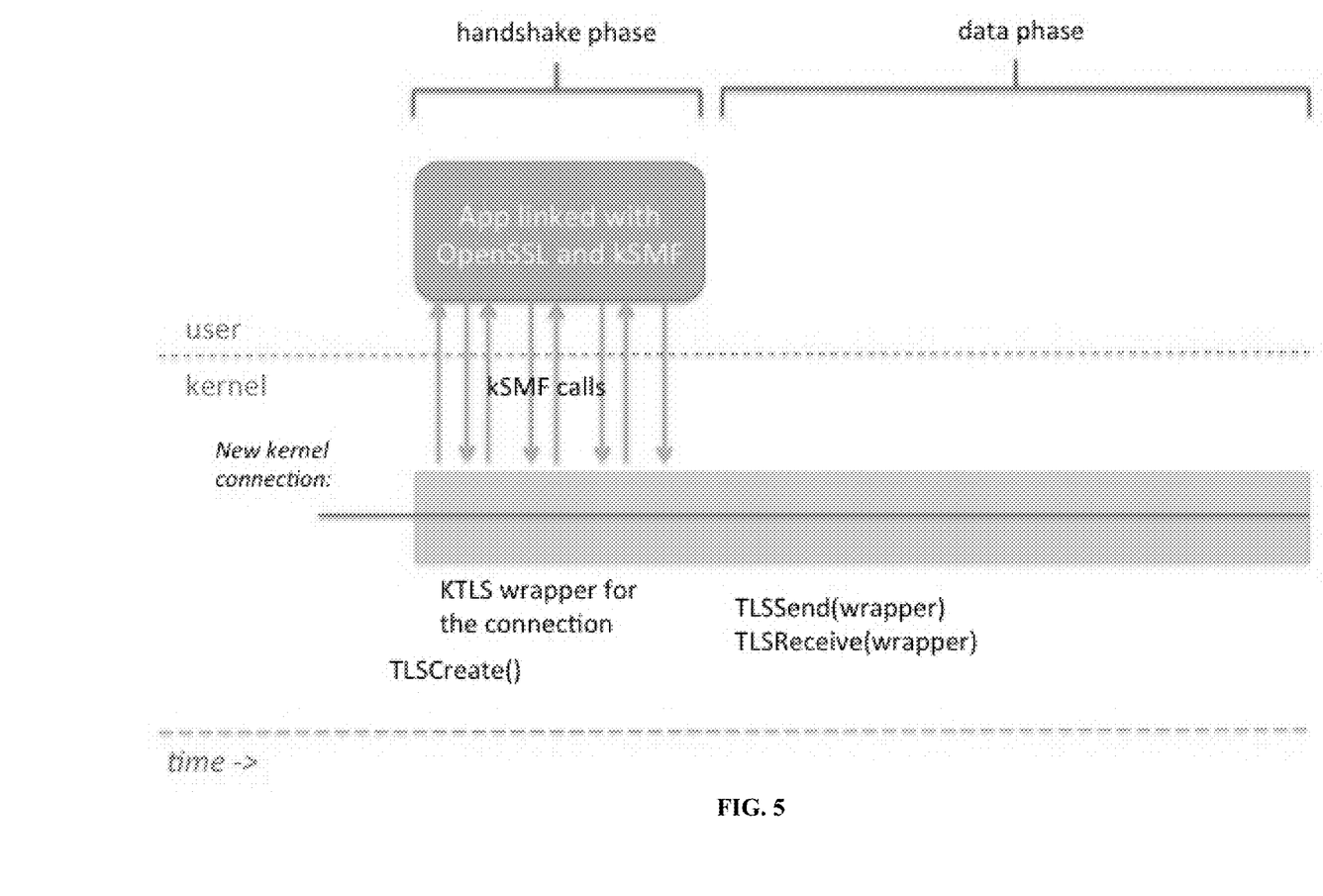
FIG. 5 is a sequence diagram of an exemplary method of facilitating secure connections for an operating system kernel.

Referring more specifically to FIG. 5, a sequence diagram of an exemplary method of facilitating secure connections for the kernel 24 is illustrated. As illustrated in FIG. 5, a proxy application 46 (referred to in FIG. 5 as the "App") in a user space is linked with a secure protocol implementation (referred to in FIG. 5 as "OpenSSL). The proxy application 46 handled the handshake phase of an SSL/TLS protocol by communicating across a connection with the kernel 24 in kernel space and using the linked secure protocol implementation 48. Subsequent to negotiating security parameter(s) during the handshake phase, the proxy application 46 sends the security parameter(s) to the kernel 24 be used to encrypt data sent by the kernel 24 from a local endpoint 26 to a remote endpoint 28 in the data phase. Thereafter, the kernel 24 proceeds to exchange data across a secure connection between the local endpoint 24 and the remote endpoint 28.

Accordingly, with this technology, the complexity of a handshake phase is carried out using a secure protocol implementation in user space, where there are greater resources as compared to kernel space. By hosting the secure protocol implementation in user space, the secure protocol implementation is more easily updated as compared to porting the secure protocol implementation to kernel space. The handshake phase with this technology arrives at security parameters corresponding to a negotiated encryption method that is communicated to the kernel. Accordingly, the kernel can then securely communicate across a connection in a data phase using the encryption method and with reduced latency as compared to carrying out the data phase by continued proxying of message and data to a proxy application in user space.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method, comprising:
   generating, by a proxy application executing on a computing device in a user space, a handshake message in response to another handshake message originating via a transmission control protocol (TCP) connection from a remote endpoint;
   sending, by the proxy application in the user space, the handshake message to a local endpoint in a kernel of an operating system of the computing device for transmission by the kernel to the remote endpoint via the TCP connection;
   determining, by the proxy application in the user space, security parameters for the TCP connection at least in part from contents of the another handshake message and using a secure protocol implementation in the user space that is linked to the proxy application;
   sending, by the proxy application in the user space, the security parameters for the TCP connection to the kernel, subsequent to determining the security parameters at least in part from the contents of the another handshake message originating from the remote endpoint, to convert the TCP connection between the local and remote endpoints into a transport layer security (TLS) connection; and
   communicating, by the kernel, data to the remote endpoint from the local endpoint using the TLS connection and the security parameters.

2. The method of claim 1, further comprising receiving, by the proxy application in the user space, the another handshake message from the local endpoint in the kernel of the operating system of the computing device.

3. The method of claim 1, further comprising encrypting, by the computing device, a first set of the data sent from the local endpoint to the remote endpoint using one or more of the security parameters.

4. The method of claim 1, further comprising initiating, by the kernel a process requiring communication with the remote endpoint, wherein the process is configured to provide storage management functionality using one or more data storage devices associated with the remote endpoint.

5. The method of claim 1, wherein the handshake message is associated with a client side of the TLS connection.

6. The method of claim 1, wherein the secure protocol implementation comprises an open secure sockets layer (SSL) (OpenSSL) library.

7. A non-transitory machine readable medium having stored thereon instructions for facilitating secure connections comprising machine executable code which when executed by a computing device causes the computing device to:
   generate, by a proxy application executing on the computing device in a user space, a handshake message in response to another handshake message originating via a transmission control protocol (TCP) connection from a remote endpoint;
   send, by the proxy application in the user space, the handshake message to a local endpoint in a kernel of an operating system of the computing device for transmission by the kernel to the remote endpoint via the TCP connection;
   determine, by the proxy application in the user space, security parameters for the TCP connection at least in part from contents of the another handshake message and using a secure protocol implementation in the user space that is linked to the proxy application;

send, by the proxy application in the user space, the security parameters for the TCP connection to the kernel, subsequent to determining the security parameters at least in part from the contents of the another handshake message originating from the remote endpoint, to convert the TCP connection between the local and remote endpoints into a transport layer security (TLS) connection; and communicate, by the kernel, data to the remote endpoint from the local endpoint using the TLS connection and the security parameters.

8. The non-transitory machine readable medium of claim 7, wherein the machine executable code when executed by the computing device further causes the computing device to receive, by the proxy application in the user space, the another handshake message from the local endpoint in the kernel of the operating system of the computing device.

9. The non-transitory machine readable medium of claim 7, wherein the machine executable code when executed by the computing device further causes the computing device to encrypt a first set of the data sent from the local endpoint to the remote endpoint using one or more of the security parameters.

10. The non-transitory machine readable medium of claim 7, wherein the machine executable code when executed by the computing device further causes the computing device to initiate, by the kernel, a process requiring communication with the remote endpoint, wherein the process is configured to provide storage management functionality using one or more data storage devices associated with the remote endpoint.

11. The non-transitory machine readable medium of claim 7, wherein the handshake message is associated with a client side of the TLS connection.

12. The non-transitory machine readable medium of claim 7, wherein the secure protocol implementation comprises an open secure sockets layer (SSL) (OpenSSL) library.

13. A computing device, comprising:
a memory containing machine readable medium comprising machine executable code having stored thereon instructions for facilitating secure connections; and
a processor coupled to the memory, the processor configured to execute the machine executable code to cause the processor to:
generate, by a proxy application executing on the computing device in a user space, a handshake message in response to another handshake message originating via a transmission control protocol (TCP) connection from a remote endpoint;
send, by the proxy application in the user space, the handshake message to a local endpoint in a kernel of an operating system of the computing device for transmission by the kernel to the remote endpoint via the TCP connection;

determine, by the proxy application in the user space, security parameters for the TCP connection at least in part from contents of the another handshake message and using a secure protocol implementation in the user space that is linked to the proxy application;

send, by the proxy application in the user space, the security parameters for the TCP connection to the kernel, subsequent to determining the security parameters at least in part from the contents of the another handshake message originating from the remote endpoint, to convert the TCP connection between the local and remote endpoints into a transport layer security (TLS) connection; and communicate, by the kernel, data to the remote endpoint from the local endpoint using the TLS connection and the security parameters.

14. The computing device of claim 13, wherein the machine executable code to further cause the processor to receive, by the proxy application in the user space, the another handshake message from the local endpoint in the kernel of the operating system of the computing device.

15. The computing device of claim 13, wherein the machine executable code to further cause the processor to encrypt a first set of the data sent from the local endpoint to the remote endpoint using one or more of the security parameters.

16. The computing device of claim 13, wherein the processor is further configured to execute the machine executable code to further cause the processor to initiate, by the kernel, a process requiring communication with the remote endpoint, wherein the process is configured to provide storage management functionality using one or more data storage devices associated with the remote endpoint.

17. The computing device of claim 13, wherein the handshake message is associated with a client side of the TLS connection.

18. The computing device of claim 13, wherein the secure protocol implementation comprises an open secure sockets layer (SSL) (OpenSSL) library.

19. The computing device of claim 13, wherein the processor is further configured to execute the machine executable code to further cause the processor to decrypt, by the kernel, additional data using one or more of the security parameters and without communicating with the proxy application in the user space, wherein the additional data is received at the local endpoint from the remote endpoint via the TLS connection.

20. The computing device of claim 13, wherein the security parameters comprise one or more keys and one or more encryption methods.

* * * * *